US009868326B2

(12) United States Patent
Najarro

(10) Patent No.: US 9,868,326 B2
(45) Date of Patent: Jan. 16, 2018

(54) ASSEMBLIES FOR TOWING

(71) Applicant: Marco A. Najarro, San Jose, CA (US)

(72) Inventor: Marco A. Najarro, San Jose, CA (US)

( * ) Notice: Subject to any disclaimer, the term of this patent is extended or adjusted under 35 U.S.C. 154(b) by 0 days.

(21) Appl. No.: 13/967,960

(22) Filed: Aug. 15, 2013

(65) Prior Publication Data

US 2015/0048596 A1 Feb. 19, 2015

(51) Int. Cl.
*B60D 1/04* (2006.01)

(52) U.S. Cl.
CPC ..................... *B60D 1/04* (2013.01)

(58) Field of Classification Search
CPC ........................................ B60D 1/04
USPC ......................... 280/452, 453, 514
See application file for complete search history.

(56) References Cited

U.S. PATENT DOCUMENTS

| | | | |
|---|---|---|---|
| 1,650,767 A * | 11/1927 | Odiorne | 280/494 |
| 2,209,007 A * | 7/1940 | Stevenson | 59/86 |
| 4,264,086 A | 4/1981 | Espejo | |
| 5,033,764 A * | 7/1991 | Blacklaw | 280/508 |
| 5,775,560 A | 7/1998 | Zahn et al. | |
| 5,850,959 A | 12/1998 | Miller | |
| 5,997,063 A | 12/1999 | McCraw | |
| 6,139,044 A | 10/2000 | Smith et al. | |
| 6,142,737 A | 11/2000 | Seeley et al. | |
| 2002/0140206 A1 * | 10/2002 | Lloyd | 280/491.5 |

OTHER PUBLICATIONS

Website printout: "Synergy Suspension Outer Diameter (OD) Tube Clamp", www.polyperformance.com/shop/Synergy-Suspension-Outer-Diameter-OD-Tube-Clamp-p-1727.html, 2 pages.
Superwinch Catalog 2009, www.scorpio.hu/download/Product_Guide_2009.pdf, 4 pages.

* cited by examiner

*Primary Examiner* — Jacob D Knutson
*Assistant Examiner* — Felicia L. Brittman
(74) *Attorney, Agent, or Firm* — Kanika Radhakrishnan; Evergreen Valley Law Group

(57) ABSTRACT

An assembly for towing vehicles has a tow hook with an angularly adjustable hook member connected to a shank, the hook member used to secure a towing strap and the shank connected to a vehicular tow hitch. The shank includes two opposing side walls with co-axial openings and a connector wall connecting the opposing side walls and forming a channel therebetween for receiving a tow mount flange which has an opening co-axial with the side wall openings. In another embodiment, a tube bumper clamp has opposing clamping members with semi-cylindrical cutouts for receiving a tube bumper. One of the clamping members includes a radially extending flange with an axial opening connectible to a tow hook or a D-ring shackle and positioned such that the tow hook or D-ring openings are co-axial to the flange openings. The hook member pivots about a pin for angular adjustment.

14 Claims, 7 Drawing Sheets

US 9,868,326 B2

ASSEMBLIES FOR TOWING

FIELD OF THE INVENTION

The invention pertains, in general, to mechanisms used in towing and, in particular, to hook assemblies and clamp assemblies for towing that may be attached to a vehicle.

BACKGROUND

Different types of tow/trailer hitches including bumper mounted hitches and/or frame mounted hitches are used for towing on a wide variety of different vehicles, including but not limited to, trucks, cars, vans, military vehicles and sport utility vehicles. FIG. 1 shows a prior art hitch mount 100 receiving a D-ring shackle 102 used as a part of a tow hitch. The prior art hitch mount 100 includes an axial body 104 including openings 106, 108 for connection to a hitch receiver (not shown) connected to a vehicle with a tow hitch assembly (not shown) and having an axial flange 110 with an opening 112 therethrough for receiving a pin 114 to connect the D-ring shackle to the flange. Often times, vehicles that are in need of towing are on a roadway. Stalled vehicles are unsafe for drivers on the roadway encountering these vehicles and for drivers of the vehicle that need to be towed. The quicker a vehicle is towed from the roadway, the safer it is for all motorists.

One problem associated with D-ring shackles is that when connecting a vehicle to be towed to the D-ring shackle with a recovery strap, a screw pin 114 of the D-ring shackle must be unthreaded and removed before the pin is passed through a loop of the recovery strap and then re-secured to the D-ring shackle. It can be challenging to perform all of these steps at once and unsafe in cases where the vehicle to be towed is located on a busy roadway and should be removed quickly.

Another problem associated with prior art towing mechanisms is that frame mounted tow hitches and some bumper mounted tow hitches alone or in combination with frame mounted members require numerous mounting members and are time consuming and relatively expensive to install.

What is desired are towing mechanisms that provide an efficient and quick connection to a vehicle to be towed.

What is also desired are towing mechanisms that are quick and relatively inexpensive to install.

SUMMARY OF THE INVENTION

In one embodiment, the invention comprises a hook assembly for use with a vehicular tow hitch, the hook assembly providing an efficient and quick connection to a vehicle to be towed. The tow hitch may be a vehicular add-on member or integral with a vehicle, for example as part of a bumper or bumper tab. The hook assembly comprises an arcuate hooking member extending from a shank member having a C-shaped cross section with opposing first and second walls and a front wall. The first side wall includes a first opening extending therethrough, the second side wall includes a second opening extending therethrough, the first and second openings in vertical alignment with and coaxial to a hitch mount opening when the hitch is joined to the shank member.

The hook assembly is easily connected to the hitch and to a hitch mount by positioning the shank member of the hook assembly to receive the hitch mount such that the hitch mount opening is vertically aligned with and coaxial to the shank openings and is disposed in between the shank openings. The hook can pivot about a pin for angular adjustment. A recovery strap used for towing a vehicle is easily looped onto the arcuate hooking member of the hook assembly providing a quick connection between the towing vehicle and the vehicle to be towed thereby speeding up the towing process and making roadways safer for motorists.

In another embodiment of the invention, a tube bumper clamp assembly is provided for efficiently and quickly connecting a towing vehicle having a tube bumper to a vehicle to be towed. The tube bumper clamp assembly comprises a pair of opposing clamping members connectible to each other. Each clamping member has an inner semi-cylindrically shaped cutout region, outer side surfaces each with at least one outer side surface opening, and at least one inner opening accessible from the outer side surface opening and extending at least partially through the clamping member.

When the clamping members are connected, the inner openings of the opposing members are in vertical alignment and an axial inner cylindrical cutout shaped is formed that receives the bumper tube. A flange extends radially from one of the clamping members and includes an axial opening extending through the flange. The flange opening allows for connection of a hook assembly or D-ring shackle which is connectible to a vehicle to be towed via a recovery strap or other means. The tube bumper clamp assembly is advantageous in that it has few mounting members and is quick to install. With the tube bumper clamp assembly, a vehicle without a tow hitch but having a tube bumper can quickly and easily be used to tow another vehicle.

BRIEF DESCRIPTION OF THE DRAWINGS

FIG. 2b is a perspective view of the tow hook of FIG. 2a.

FIG. 2c is a first side view of the tow hook of FIG. 2a.

FIG. 2d is a second side view of the tow hook of FIG. 2a.

FIG. 2e is a front view of the tow hook of FIG. 2a.

FIG. 2f is a top view of the tow hook of FIG. 2a.

FIG. 3b is an exploded view of the tube bumper clamp assembly of FIG. 3a.

FIG. 3c is a front view of a first clamping member of the tube bumper clamp assembly of FIG. 3a.

FIG. 3d is a side view of a first clamping member of the tube bumper clamp assembly of FIG. 3a.

FIG. 3e is a top view of a first clamping member of the tube bumper clamp assembly of FIG. 3a.

FIG. 3f is a front view of a second clamping member of the tube bumper clamp assembly of FIG. 3a.

FIG. 3g is a side view of a second clamping member of the tube bumper clamp assembly of FIG. 3a.

FIG. 3h is a top view of a second clamping member of the tube bumper clamp assembly of FIG. 3a.

DETAILED DESCRIPTION

Figure 2A:
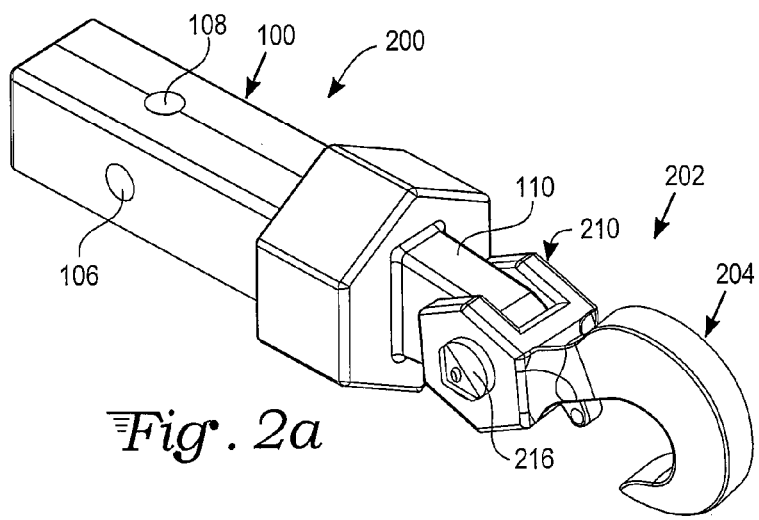
FIG. 2a is a perspective view of a hook assembly including a tow hook.
Figure 2B:
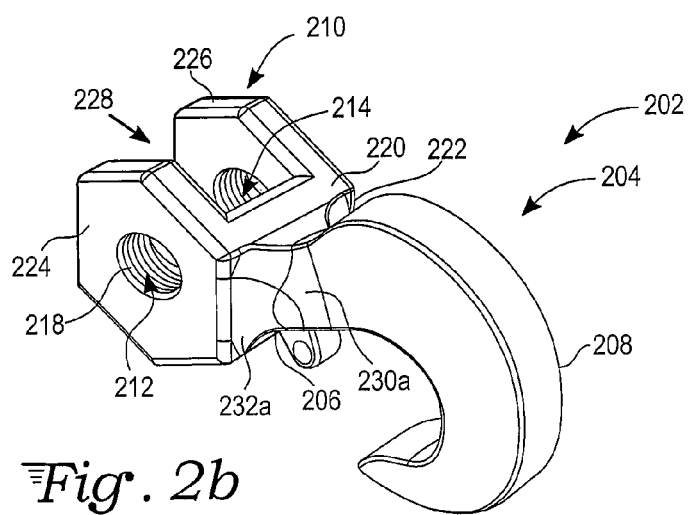
Figure 2C:
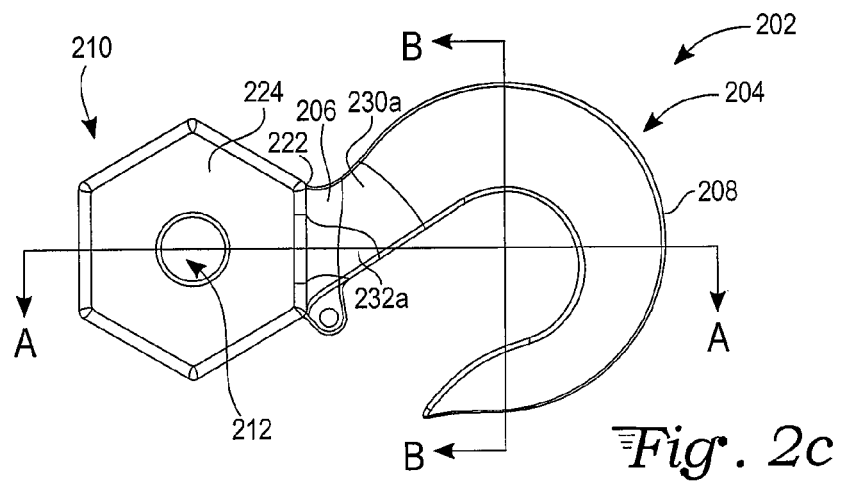
Figure 2D:
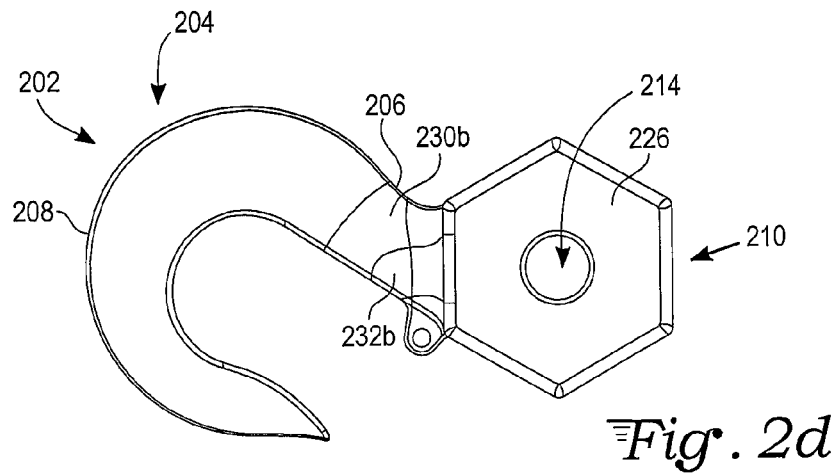
Figure 2E:
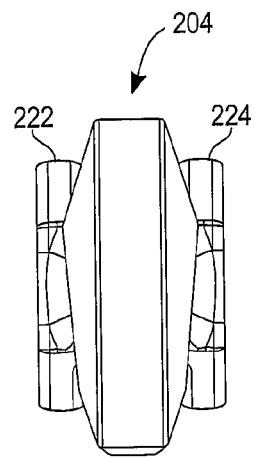
Figure 2F:
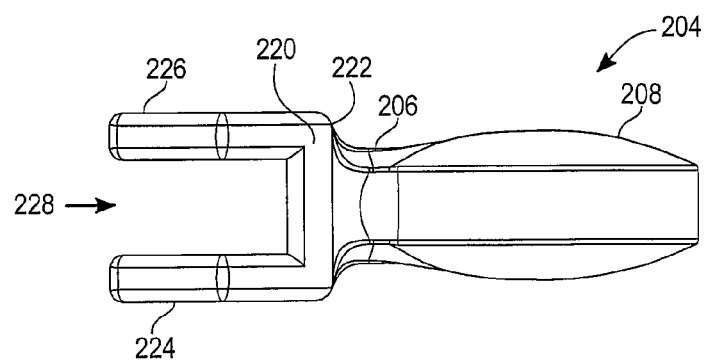
Figure 2G:
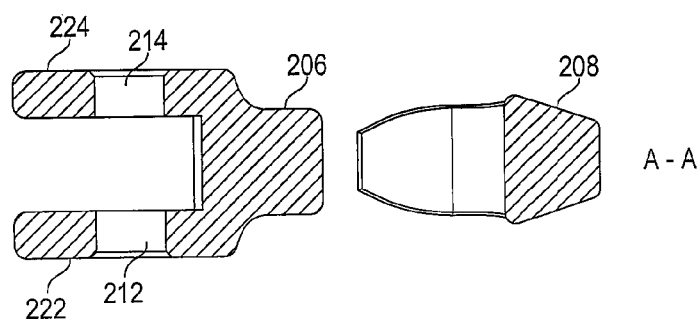
FIG. 2g is a cross sectional view of FIG. 2c taken along the lines A-A.
Figure 2H:
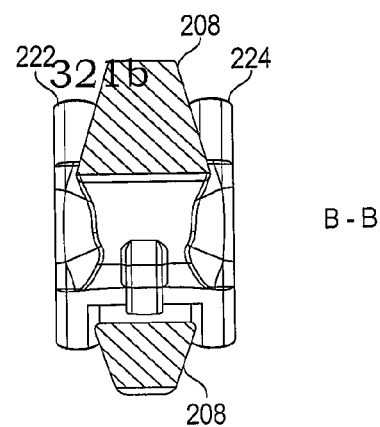
FIG. 2h is a cross sectional view of FIG. 2c taken along the lines B-B.

With reference to FIG. 2*a*, there is seen a tow arm 200 having the inventive tow assembly featuring a tow hook 202 (FIGS. 2*a*-2*f*) including an arcuate hooking member 204 with a neck 206 and a hook 208 and a shank member 210 joined to the arcuate hooking member 204. The tow hook 202 may be made by a process including but not limited to casting, forging, and/or machining. Materials including but not limited to steel and/or aluminum may be used to make the tow hook. In one example, the tow hook 202 is forged and is comprised of, for example, titanium based steel. In another example, the tow hook is machined out of a block of aluminum. The tow hook 202 is joined, for example, to tow mount 100 known in the art or other types of tow mounts connected to a vehicle (not shown) used for towing. The tow hook 202 is joined to the tow mount 100 by way of openings 212 and 214 in the shank that are coaxial with openings 212 and 214 when the flange 110 is received by a channel 228 of the shank member 210. The tow hook 202 is secured to the tow mount 100 by securing means such as a screw pin 216, a nut and bolt assembly (not shown) or other means which is insertable within openings 212, 214, and 112 in a manner allowing angular adjustment of the hook by pivoting about the pin. Openings 212 and 214 in the shank may include threads 218 to receive the screw pin 216 for pivoting and joinder. The hook member 204 easily and securely receives a recovery strap loop (not shown) or other tow strap or tow connection device connected to a vehicle to be towed (not shown).

The shank member 210 or portion may be connected, attached, integral with or otherwise joined to the arcuate hooking member 204. The shank member 210 has a C-shaped cross section (FIG. 2*f*) and includes a connector wall 220 having a front surface 222 from which the hooking member 204 extends and first side wall 224 and second side wall 226 opposing each other. The opposing walls 224 and 226 are connected at one end via the connector wall 220 and define the open channel 228 therebetween. In one example, the side walls 224 and 226 are hexagonal in shape (FIGS. 2*c* and 2*d*) and the connector wall is square or rectangular. The first side wall 224 has opening 212 disposed therethrough and the second side wall 226 has an opening 214 disposed therethrough. The openings 212 and 214 are preferably centrally located on the first and second walls 224 and 226, respectively. The openings 212 and 214 are co-axial and are typically in vertical alignment.

The neck 206 of the arcuate hooking member 204 extends from the front surface 220 of the shank member 210 into the hook 208. In one example, the front surface 222 comprises a length at least as long as a length of the neck 206. In another example, the neck 206 does not extend over edges of the front surface 222. In one embodiment, with reference to FIGS. 2*c*, 2*d*, and 2*e*, the neck 206 includes large fillets 230*a* and 230*b* on one side of the neck and 232*a* and 232*b* on the other side of the neck near the shank for providing strength to the neck 206 and/or hook 208.

Figure 4:
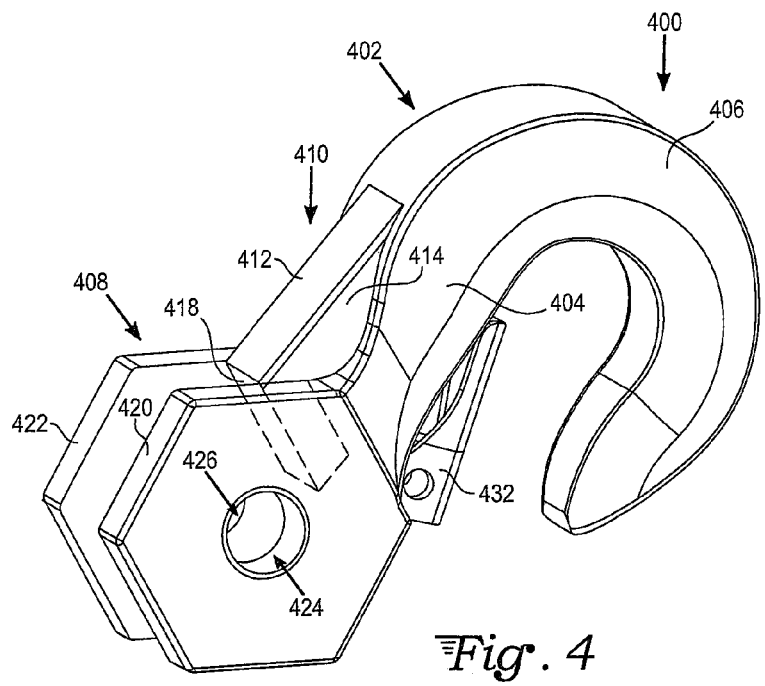
FIG. 4 is a perspective view of another embodiment of a tow hook.

With reference to FIG. 4, another embodiment of a tow hook 400 is seen that may be used as the tow hook in a tow assembly, such as tow assembly 200. The tow hook 400 includes an arcuate hooking member 402 with a neck 404 and a hook 406 and a shank member 408 joined to the arcuate hooking member 402. The tow hook 400 may be made by a process including but not limited to casting, forging, and/or machining. Materials including but not limited to steel and/or aluminum may be used to make the tow hook. In one example, the tow hook 400 is forged and comprised of, for example, titanium based steel. In another example, the tow hook is machined out of a block of aluminum. The tow hook includes a gusset 410 providing added strength to the hook. The gusset extends tangentially from the arcuate hooking member 402 towards the shank member 408. The gusset 410 includes top surface 412, two opposing side surfaces (one of which 414 is seen) and front surface 418 which extends downwardly in between plates 420 and 422 of the shank member 408 but not past shank openings 424 and 426. Front surface 418 may extend perpendicularly downwardly from the top surface or at a different angle. Side surfaces, including side surface 414 and opposing side surface (not seen) may contact inner surfaces of plates 420 and 422, respectively, connecting them and providing support to them. The tow hook 400 may also include a spring bias safety latch 432.

Figure 1:
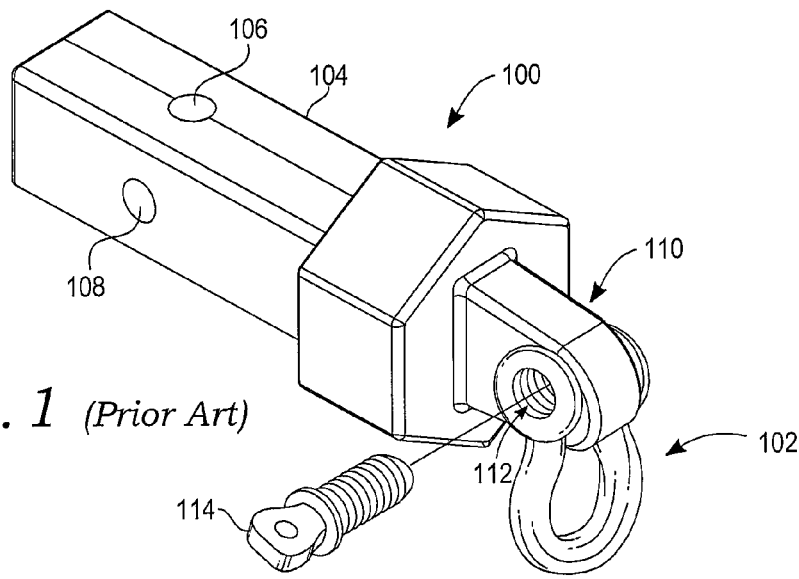
FIG. 1 is a perspective view of a prior art hitch mount and D-ring shackle.
Figure 3A:
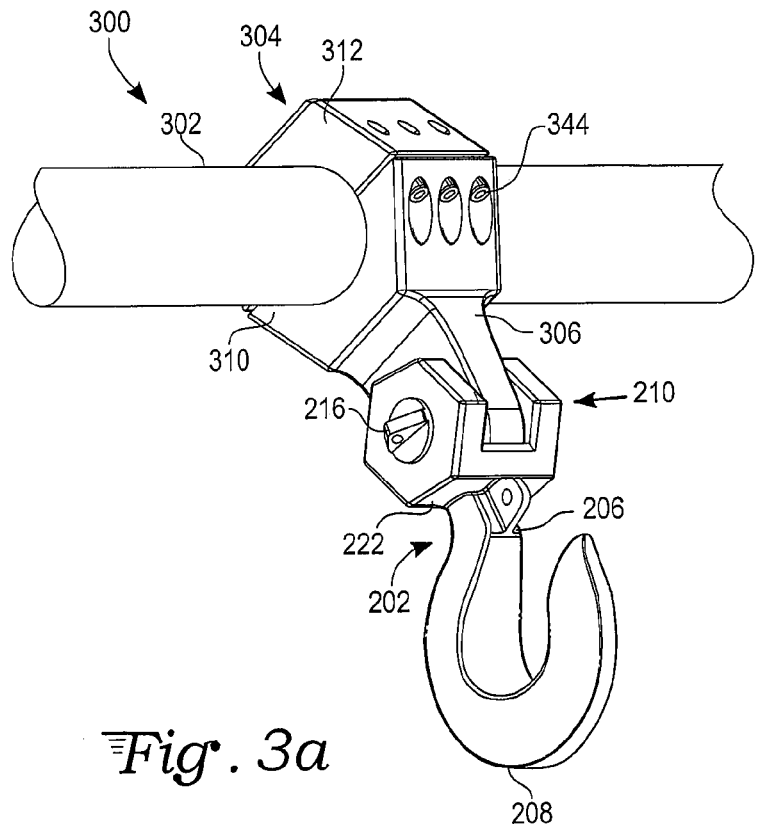
FIG. 3a is a perspective view of the tube bumper clamp assembly connected to a tube bumper.

With reference to FIG. 3*a*, a tube bumper clamp assembly 300 connectible to a tube bumper 302 of a vehicle (not shown) which is used to tow another vehicle (not shown) is seen. Tube bumper clamp assembly 300 includes a tube bumper clamp 304 connectible to, for example, the tow hook 202 at a flange 306. In another example, a D-ring shackle 102 (FIG. 1), may be connected to the tube bumper clamp 304 at the flange 306 and form a part of the tube bumper assembly 300 to connect the vehicle used to tow to another vehicle. Other tow connection means known in the art may also be used to connect the tube bumper clamp 304 to a vehicle to be towed.

Figure 3B:
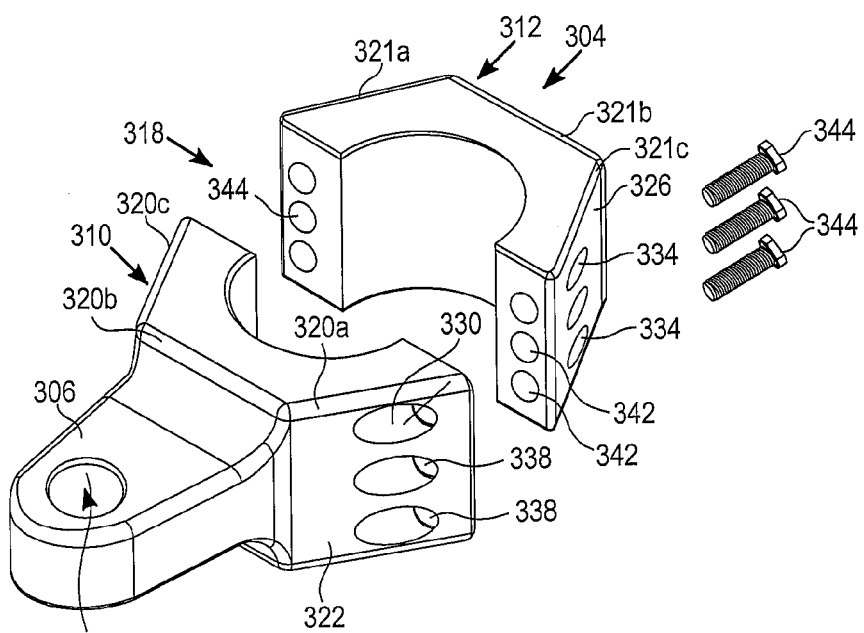
Figure 3C:
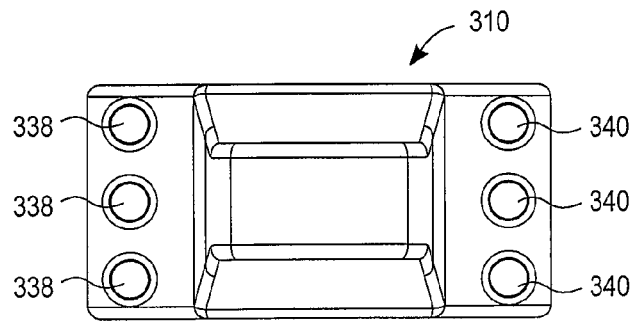
Figure 3D:
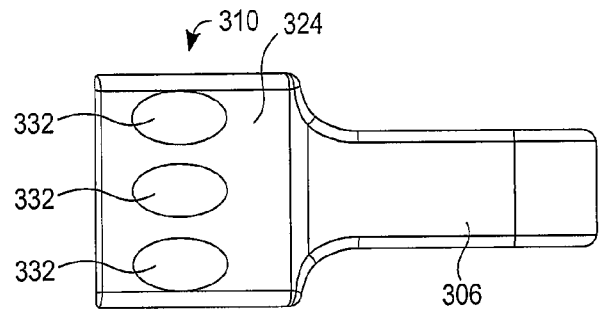
Figure 3E:
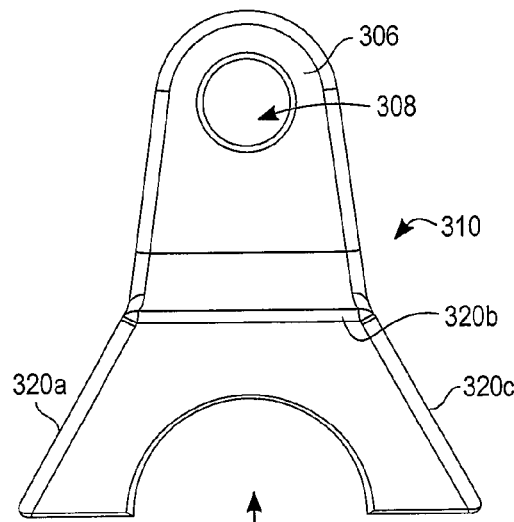
Figure 3F:
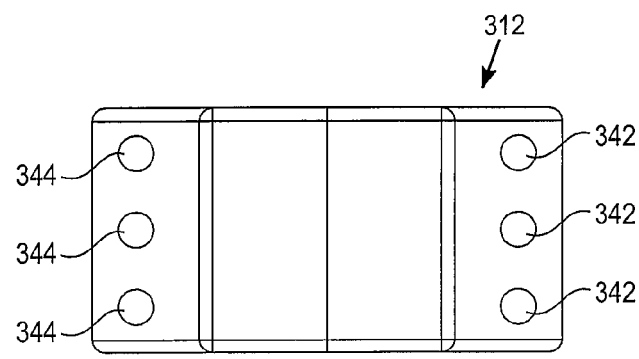
Figure 3G:
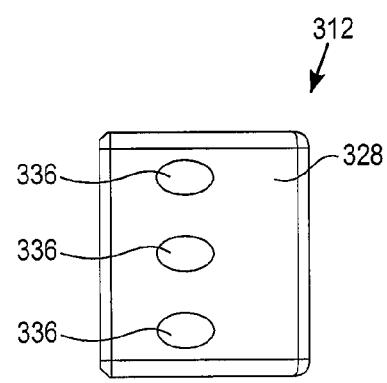
Figure 3H:
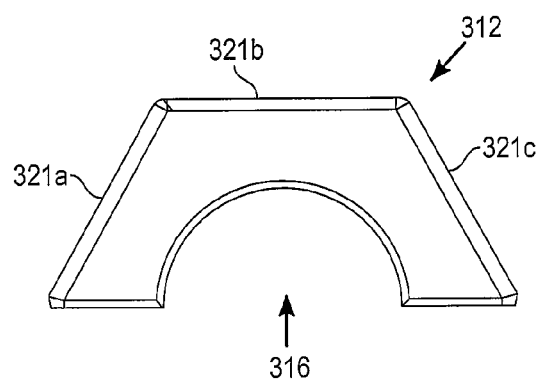

The tube bumper clamp 304 may be made by a process including but not limited to casting, forging, and/or machining. Materials including but not limited to steel and/or aluminum may be used to make the bumper clamp 304. In one example, the tube bumper clamp 304 is forged and is comprised of titanium based steel. In another example, the tube bumper clamp 304 is machined out of a block of aluminum. As seen in FIGS. 3*b* and 3*e*, flange 306 includes an axial opening 308 extending through the flange 306 which is coaxial with openings 212 and 214 of shank 210 of tow hook 202 when the tow hook 202 receives the flange. In one example, openings 308, 212 and 214 are in vertical alignment when the tow hook 202 receives the flange 304. Securing means such as screw pin 216, nuts and bolts (not shown) or other means are used to secure the tow hook 202 to the tube bumper clamp 304.

With reference to FIGS. 3*b*-3*h*, components of the tube bumper clamp 304 are seen to include a first clamping member 310 and a second clamping member 312 opposing the first member 310. The two clamping members 310 and 312 are connectible to each other and each clamping member has an inner semi-cylindrical shaped cutout 314 and 316, respectively, which when the two clamping members 310 and 312 are connected form an axial cylindrical shaped cutout 318 for receiving the tube bumper 302. In one example, when the clamping members 310 and 312 are connected a hexagonal shape is formed by edges 320*a*, 320*b* and 320*c* and 321*a*, 321*b* and 321*c* of the clamping members 310 and 312, respectively. Each clamping member 310 and 312 has outer side surfaces 322, 324 and 326, 328, respectively, with outer side surface openings 330, 332 and 334, 336, respectively, and inner openings 338, 340 and 342, 344, respectively, accessible by the corresponding outer side surface openings 322, 324 and 326, 328. The inner openings 338, 340 and 342, 344 are disposed within clamping member 310 or 312, respectively.

When the clamping members 310 and 312 are connected to each other and the tube bumper 302, the inner openings 338, 340 and 342, 344 are positioned coaxially and/or in vertical alignment. Bolts 344 or other securing means are disposed with the inner openings 338, 340 and 342, 344 when used to secure the two clamping members to each other. Access of the bolts 344 to the inner openings may be achieved through the outer openings 330, 332 and 334, 336. Clamping member 310 includes the flange 306 disposed at a front end extending radially from the clamping member 310.

The tube bumper clamp 304 provides a quick, easy and inexpensive way to provide a towing mechanism to vehicles having tube bumpers 302 so that they may be used for towing other vehicles. In operation, each clamping member 310 and 312 is connected to the tube bumper 302 of a vehicle by positioning each clamping member about a portion of the tube bumper so that the clamping members make contact with each other, the cylindrical shaped cutout 318 is formed and the inner openings are coaxial to the opposing openings. Bolts 344 or other securing means secure the clamping members 310 and 312 to each other when the bolts 344 are secured in the inner openings 228, 340 and 342, 344 to fasten the clamping members 310 and 312 to each other and to the tube bumper 302. The clamping member 310 with the flange 306 is connected such that the flange 306 faces away from the towing vehicle. This way, the flange opening 308 may be connected to tow hook 202 or D-ring shackle 102 or other towing mechanisms connectible to a vehicle to be towed.

Figure 5:
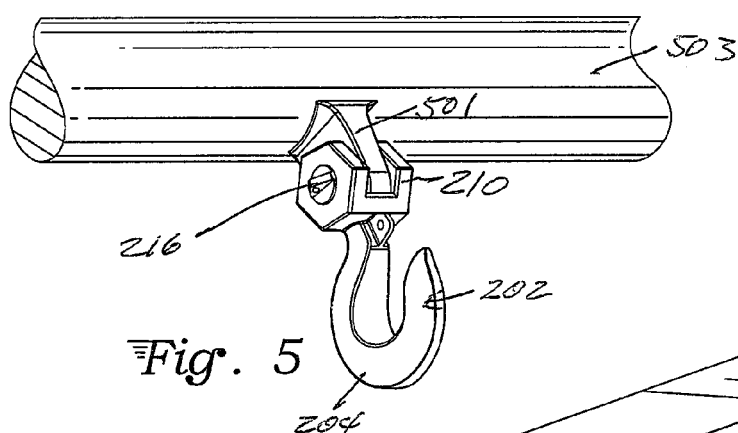
FIG. 5 is a perspective view of a tow assembly of FIG. 2b connected to a vehicular bumper tab.

In FIG. 5 a tow assembly features a tow hook 202 with shank member 210 and hooking member 204. The tow hook is joined to a vehicular tab 501 associated with a round tow bar 503 or a tubular bumper in a manner allowing pivoting about pin 216.

Figure 6:
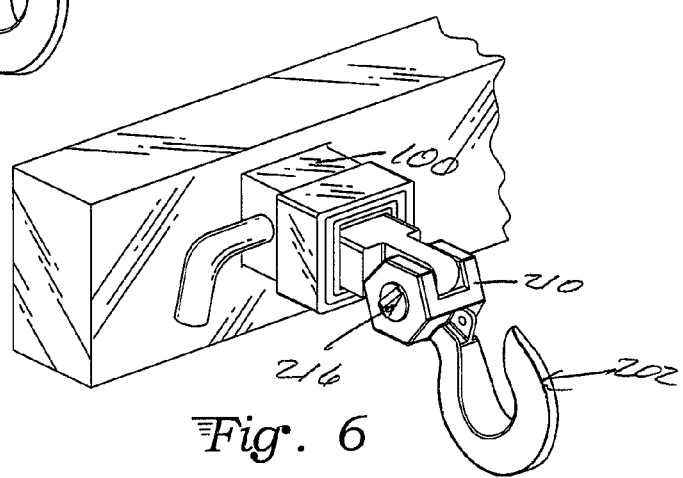
FIG. 6 is a perspective view of a tow assembly of FIG. 2*b* connected to a tow hitch associated with a bumper.

In FIG. 6 a tow assembly features tow hook 202 associated with a tow mount 100, as in FIG. 2a, with shank member 210 joined to a flange with pin 216 allowing pivot adjustment. Tow mount 100 may be part of a vehicle undercarriage or be part of a bumper assembly.

What is claimed is:

1. A tow assembly for connection to a tow hitch associated with a vehicle bumper or bumper tab, the tow assembly comprising:
    a tow hook including an arcuate hooking member including a neck and a hook having a curvature disposed within a plane; and
    a shank member integrally connected to the arcuate hooking member for joinder to the tow hitch, the shank member having a C-shaped cross section, with opposing first and second hexagonal side walls and a rectangular front wall serving as a connector wall between the hexagonal side walls, the neck of the hooking member extending from the front wall, the first hexagonal side wall including a first side wall opening extending therethrough and the second hexagonal side wall including a second side wall opening extending therethrough, the first and second side wall openings in vertical alignment and coaxial with a hitch mount opening and a pivot axis when the hitch is joined to the shank member in a pivoting manner, wherein the plane of curvature of the hook is transverse to the pivot axis;
    wherein the tow hook includes a gusset having a top surface extending tangentially from the hook toward the rectangular connector wall of the shank portion and extending in between the first and second hexagonal side walls and a front surface in a manner extending downwardly from the top surface toward the shank portion but not past the side wall openings.

2. The tow assembly of claim 1, further comprising the hitch mount having the hitch mount opening.

3. The tow assembly of claim 1, wherein the front wall comprises a length at least as long as the neck.

4. The tow assembly of claim 1, wherein the neck includes fillets.

5. The tow assembly of claim 1, wherein the tow hook is comprised of a forged titanium based steel.

6. The tow assembly of claim 1, further comprising securing means for securing the tow hitch to the hook.

7. The tow assembly of claim 1 further comprising a screw pin for securing the tow hitch to the tow hook wherein the first and second side wall openings are threaded for threadably receiving the screw pin, the pin acting as a pivot.

8. The tow assembly of claim 1, wherein the arcuate hooking member and the shank member are integral.

9. The tow assembly of claim 1, wherein the tow hook further includes a spring biased safety latch.

10. A tow assembly for connection to a tow hitch associated with a vehicle bumper or bumper tab, the tow assembly comprising:
    a tow hook including an integral shank portion having a pair of opposing hexagonal walls connected at one end by a rectangular connector wall and defining an open channel therebetween, the opposing hexagonal walls having central axial openings; and
    an arcuate hooking portion including a hook having a curvature disposed within a plane and a neck extending radially from the connector wall of the shank portion towards the hook, a tip of the hook extending in a direction toward the shank portion, wherein the central axial openings are in vertical alignment and coaxial with a tow hitch opening and a pivot axis when the tow hitch is joined to the shank portion, wherein the plane of curvature of the hook is transverse to the pivot axis;
    wherein the tow hook includes a gusset having a top surface extending tangentially from the hook toward the connector wall of the shank portion and extending in between the first and second hexagonal walls and a front surface in a manner extending downwardly from the top surface toward the shank portion but not past the side wall openings.

11. The tow assembly of claim 10, wherein the connector wall is of a length at least as long as the neck.

12. The tow assembly of claim 10, wherein the neck includes fillets.

13. The tow assembly of claim 10, wherein the tow hook is comprised of titanium based steel.

14. The tow assembly of claim 10, wherein the tow hook includes a gusset having a top surface extending tangentially from the hook toward the shank portion and a front surface extending downwardly from the top surface and in between opposing hexagonal walls but not past the central axial openings of the shank portion.

* * * * *